US007657552B2

(12) United States Patent
Welcker et al.

(10) Patent No.: US 7,657,552 B2
(45) Date of Patent: Feb. 2, 2010

(54) DECLARATIVE SEQUENCED REPORT PARAMETERIZATION

(75) Inventors: Brian Welcker, Seattle, WA (US); Christopher Hays, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 165 days.

(21) Appl. No.: 10/365,304

(22) Filed: Feb. 12, 2003

(65) Prior Publication Data

US 2004/0158557 A1    Aug. 12, 2004

(51) Int. Cl.
*G06F 7/00*    (2006.01)
(52) U.S. Cl. ..................................... 707/102
(58) Field of Classification Search ............... 707/1–10, 707/104.1; 715/501.1
See application file for complete search history.

(56) References Cited

U.S. PATENT DOCUMENTS

| | | | | |
|---|---|---|---|---|
| 5,261,093 A | | 11/1993 | Asmuth et al. | 395/600 |
| 5,603,025 A | * | 2/1997 | Tabb et al. | 707/2 |
| 5,787,417 A | * | 7/1998 | Hargrove | 707/4 |
| 5,809,266 A | * | 9/1998 | Touma et al. | 715/764 |
| 5,852,818 A | * | 12/1998 | Guay et al. | 707/1 |
| 5,978,787 A | * | 11/1999 | Wong et al. | 707/2 |
| 5,983,219 A | | 11/1999 | Danish et al. | 707/3 |
| 6,131,098 A | | 10/2000 | Zellweger et al. | 707/102 |
| 6,160,549 A | * | 12/2000 | Touma et al. | 715/762 |
| 6,199,058 B1 | * | 3/2001 | Wong et al. | 707/2 |
| 6,233,583 B1 | * | 5/2001 | Hoth | 707/102 |
| 6,236,987 B1 | * | 5/2001 | Horowitz et al. | 707/3 |
| 6,349,298 B1 | * | 2/2002 | Malone et al. | 707/7 |
| 6,460,031 B1 | * | 10/2002 | Wilson et al. | 707/3 |
| 6,625,617 B2 | * | 9/2003 | Yarnall et al. | 707/104.1 |
| 2002/0013786 A1 | * | 1/2002 | Machalek | 707/503 |
| 2003/0040936 A1 | * | 2/2003 | Nader et al. | 705/1 |
| 2004/0158557 A1 | * | 8/2004 | Welcker et al. | 707/3 |
| 2004/0193644 A1 | * | 9/2004 | Baker et al. | 707/104.1 |
| 2005/0144554 A1 | * | 6/2005 | Salmon et al. | 715/501.1 |

FOREIGN PATENT DOCUMENTS

| | | |
|---|---|---|
| EP | 0 847 019 A1 | 6/1998 |
| JP | 8241336 (A) | 9/1996 |
| JP | 2002041948 (A) | 2/2002 |
| JP | 2003016085 (A) | 1/2003 |

(Continued)

OTHER PUBLICATIONS

Title: A Framework for Choosing a Database Query Language By: Matthias Jarke and Yannis Vassiliou Date: Sep. 1985.*

(Continued)

*Primary Examiner*—Cheyne D Ly
(74) *Attorney, Agent, or Firm*—Lee & Hayes, PLLC

(57) ABSTRACT

User values and selections are collected and provided to a report server that customizes a generically defined report pursuant to the user values and selections. An ordered set of report parameters is declared in the definition of a report and then this parameter definition is used to drive user prompting and execution of the report. As parameter values are collected in sequence order, a value retrieved or specified by the user for one parameter may be used to generate the set of the allowed values or default value of a parameter later in the sequence. Parameters are dynamically presented to the user. After values for all parameters been retrieved or specified, a report is generated by the report server.

33 Claims, 8 Drawing Sheets

FOREIGN PATENT DOCUMENTS

| | | |
|---|---|---|
| RU | 2006647 | 1/1994 |
| RU | 2186423 | 9/2000 |
| RU | 2186423 | 7/2002 |
| RU | 2191428 | 10/2002 |
| WO | WO 02/44942 A1 | 6/2002 |

OTHER PUBLICATIONS

Title: XML Quer Forms (XQForms): Declarative Specificatrion of XML Query Interfaces By: Petropoulos et al Date May 2001.*

Burke, R. "Hybrid Recommender Systems: Survey and Experiments", *User Modeling and User-Adapted Interaction*, Kluwer Academic Publishers, Nov. 2002, 12(4), 331-370.

Harandi, M.T. et al., "Rule Base Management Using Meta Knowledge", *ACM*, 1986, 261-267.

Lee, M. et al., "A Web-Based Knowledge Network for Supporting Emerging Internet Applications", *World Wide Web*, Kluwer Academic Publishers 2001, 4(1-2), 121-140.

Lohman, G.M., "Grammar-like Functional Rules for Representing Query Optimization Alternatives", *ACM*, 1988, 18-27.

Maurer, F. et al., "Integrating Process Support and Knowledge Management for Virtual Software Development Teams", *Annals of Software Engineering*, Dec. 2002, 14(1-4), 145-168.

Sliski, T.J. et al., "An Architecture for Flexible, Evolvable Process-Driven User-Guidance Environments", *ACM*, 2001, 33-43.

Sullivan, K.J. et al. "Reconciling Environment Integration and Component Independence", *ACM*, 1990, 22-33.

Danish, S., "Building Database-Driven Electronic Catalogs", *SIGMOD Record*, Dec. 1998, 27(4), 15-20, XP-002253622.

Kay, A., "Computer Software", *Scientific American*, 1984, 251(3), 41-47, XP-000715884.

Pollitt, A.S. et al., "HIBROWSE: Adding the Power of Relational Databases to the Traditional IR Architecture- The Future for Graphic User Interfaces", *Proceedings of the Research Colloquium of the British Computer Society Systems and Current Research*, 1993, 108-118, XP-008005790.

Young, D. et al., "A Graphical Filter/Flow Representation of Boolean Queries: A Prototype Implementation and Evaluation", *Technical Report*, Feb. 1993, 1-32, XP-002210916.

* cited by examiner

DECLARATIVE SEQUENCED REPORT PARAMETERIZATION

FIELD OF THE INVENTION

This invention relates in general to the field of information systems. More particularly, this invention relates to the parameterization of data.

BACKGROUND OF THE INVENTION

Information systems often need to retrieve values from a user so that the appropriate information is delivered to the user at the right time. In query-based reporting systems, this can be accomplished through report parameterization. Parameters allow for reports to be customized based on user choices. Conventional reporting products, however, only provide static parameter selection. In this manner, data dependencies are not exploited by the report generator, leading to inefficient processing and presentation of data and reports. Moreover, conventional reporting products provide inefficient and unfriendly presentation of subsequent data and selectable parameters to the user.

For example, FIG. 2 is a flowchart of a conventional method of report processing and generation. At step 200, a report definition is retrieved which includes the list of parameters and, if specified, the possible values for each parameter. Then, at step 230, a parameter from the list is retrieved and it is determined at step 240 if the parameter is marked for dropdown (it has multiple possible values). If so, all the possible values of the field are selected at step 250, and provided to the user. This can be a long cumbersome list of values. The user is then prompted for a value from the dropdown list(s) at step 260. If the parameter is not marked for dropdown at step 240, then processing proceeds directly to step 260 with the user being prompted for value(s) (not from a dropdown list). It is then determined at step 270 if any parameters are remaining in the list from step 220. If so, processing returns to step 230. After all of the parameters have been retrieved and used to prompt the user for value(s), then a report is executed, at step 280. It should be noted that in this conventional method, data dependencies are not exploited by the report generator, and the choices presented to the user are not dynamically determined or subset-limited based on his previous selections.

Accordingly, there is a need to provide a dynamic reporting product including systems and methods that overcome the problems of the prior art and more precisely and efficiently tailor information delivery to a user's needs. It is desirable to provide cascaded parameters, such that a user selectable parameter is dependent on an earlier user selection.

SUMMARY OF THE INVENTION

The present invention is directed to improved report parameterization systems and methods in which user values and selections are collected and provided to a report server that customizes a generically defined report pursuant to the user values and selections.

An ordered set of report parameters is declared in the definition of a report and then this parameter definition is used to drive user prompting and execution of the report. As parameter values are collected in sequence order, a value retrieved or specified by the user for one parameter may be used to generate the set of the allowed values or default value of a parameter later in the sequence. Parameters are dynamically presented to the user. After values for all parameters been retrieved or specified, a report is generated by the report server.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

Parameterized reports provide flexibility by allowing a report designer to specify a set of values that can be supplied by the user during report execution. Data is transformed from a database into a readable form, with information that a user wishes to see and not other data. Parameters are used to constrain data or highlight data, for example. Parameters are dynamically presented to the user. For example, if the user is prompted to select a state of residence and the user selects "Washington", then the next choices that are presented to the user are constrained to the cities in Washington.

Exemplary Computing Environment

Figure 1:
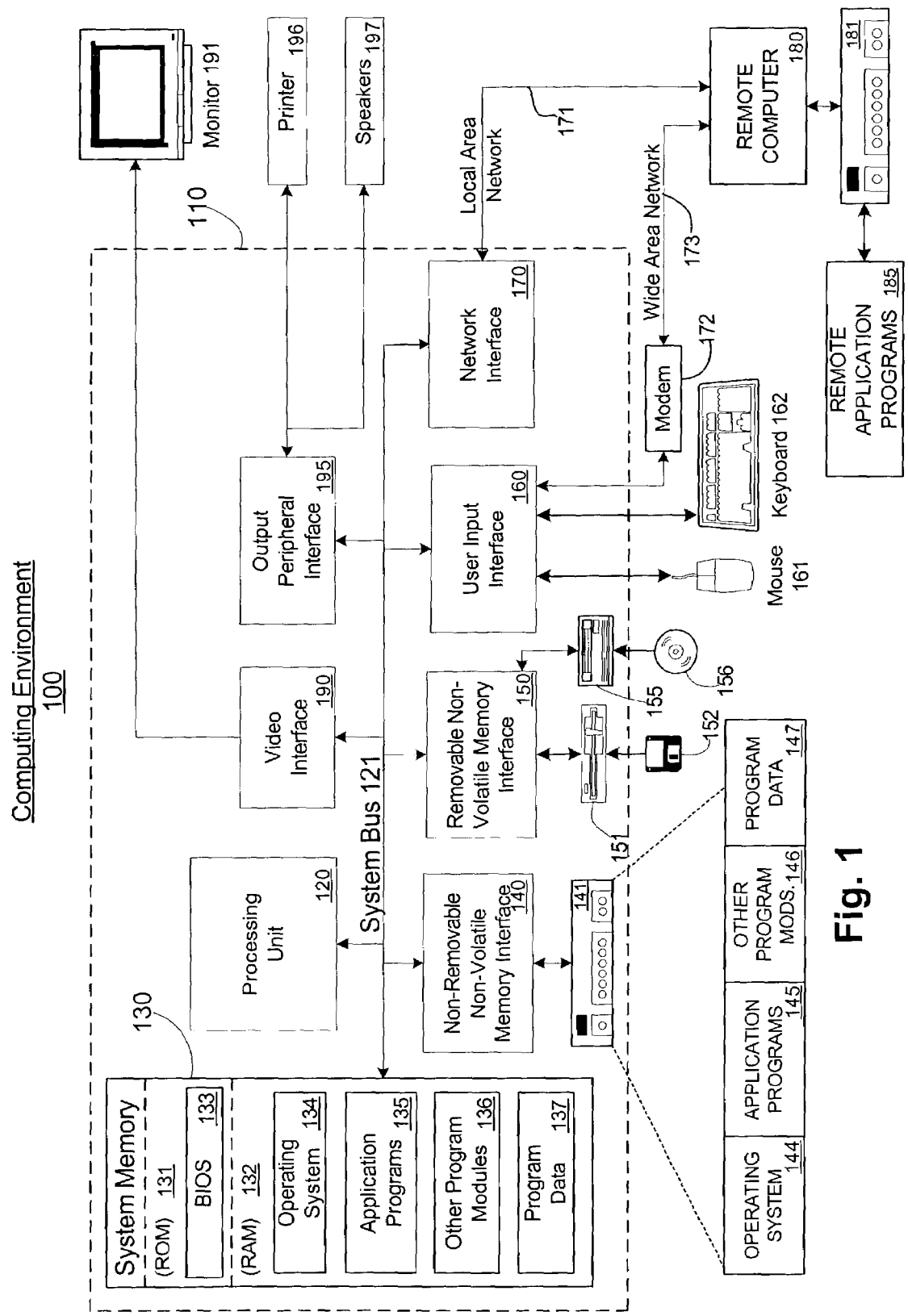
FIG. 1 is a block diagram showing an exemplary computing environment in which aspects of the invention may be implemented.
Figure 2:
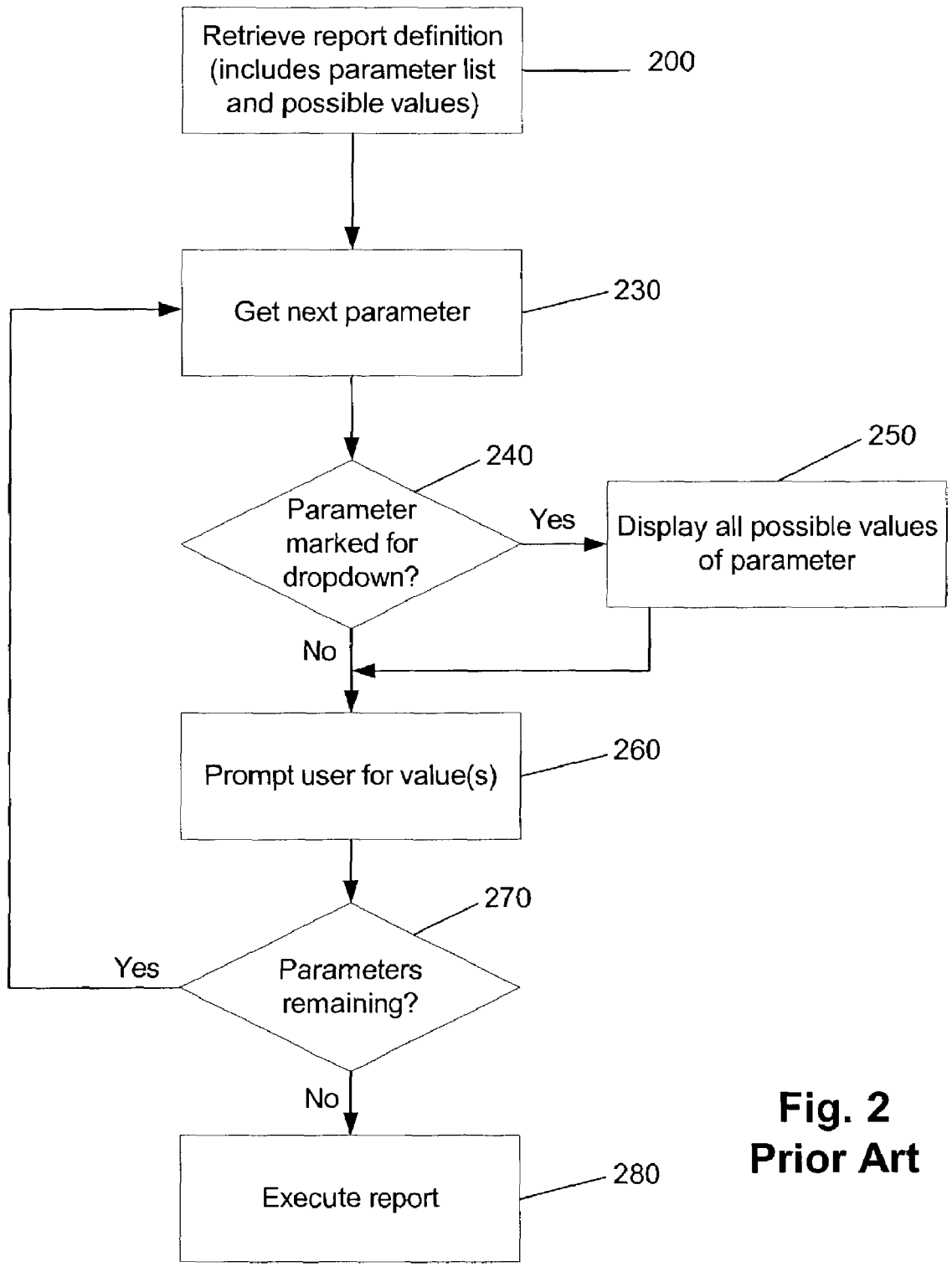
FIG. 2 is a flowchart of a conventional method of report processing and generation.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks Or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or a "middle man" object between a coprocessor and requesting object, such that services may be performed by, supported in, or accessed via all of .NET's languages and services, and in other distributed computing frameworks as well.

Exemplary Embodiments

An ordered set of report parameters is declared in the definition of a report and then this parameter definition is used to drive user prompting and execution of the report (a report definition is described further below with respect to FIG. 5). An exemplary definition of a parameter includes: name of parameter; data type (string, number, date, etc.); set of allowed values or an optional query used to retrieve set of allowed values; the default value or an optional query used to retrieve the default value and whether to prompt the user for a value. The allowed values and default values queries can be arbitrarily complex and are desirably defined by the designer of the report.

In addition, the allowed values and default values queries can be parameterized by the values of previously specified parameter values.

This enables a value retrieved or specified by the user for one parameter to be used to generate the set of, the allowed values or default values of a parameter later in the sequence. After values for all parameters been retrieved or specified, a report is generated by the report server.

As an example, assume a report definition with two parameters, "Product Category" and "Product Name". The list of product categories is retrieved from a database and the user is prompted to select one item in the list. Once the user makes a selection, a list of product names within the selected category is retrieved from a database. The user then selects one product name from the list and the report executes using the selected product.

As another exemplary scenario involving dynamic parameter lists and defaults of the present invention, assume that there exist three parameters defined for a report, "Region", "State" and "City". A user interface is display with three dropdown lists used for input for each parameter. The "Region" dropdown is populated with the regions in the United States. When a region is selected (e.g., northwest) the data source associated with the State parameter is queried using the region that was selected in the "Region" dropdown list as a query parameter. The "States" dropdown list is populated with the result set from the parameter query. When a selection is made in the "States" dropdown list (e.g., Washington) the data source associated with the "City" parameter is queried using the state that was selected in the "State" dropdown list as a query parameter.

Figure 3:
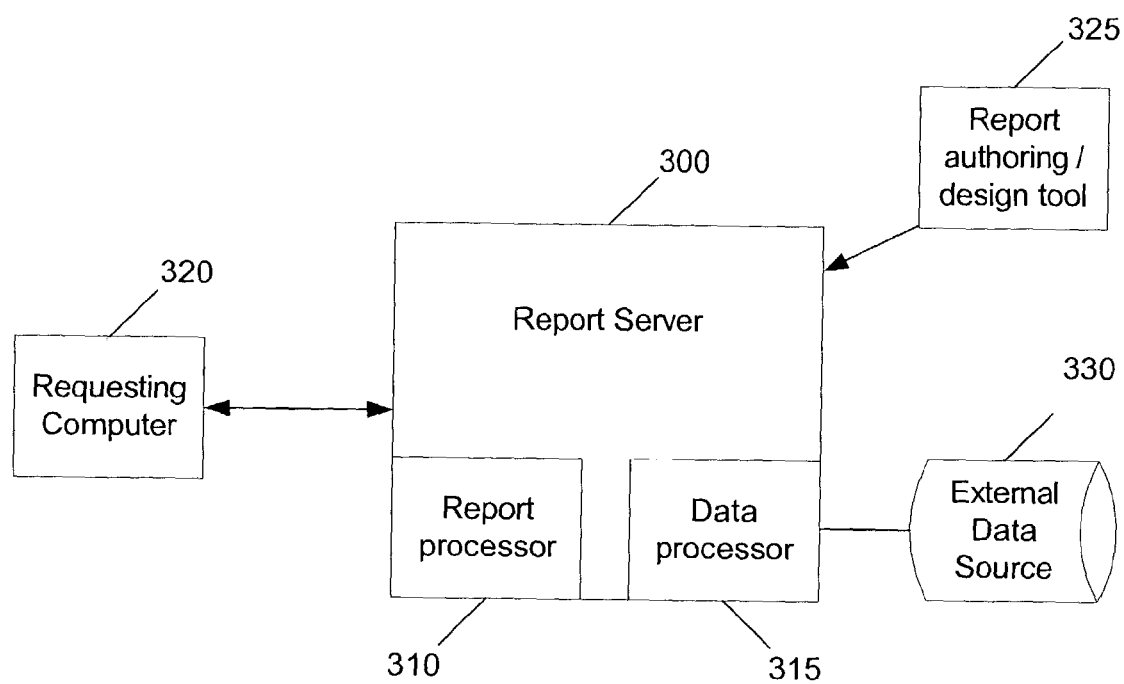
FIG. 3 is a high level block diagram of an exemplary system in accordance with the present invention.

FIG. 3 is a high level block diagram of an exemplary system in accordance with the present invention. A report server 300, comprising a report processor 310 and a data processor 315, interacts with a requesting computer 320, as set forth above. The report server 300 accesses a storage device, such as an external data source 330 for various values and data. Responsive to a request for a report, via the requesting computer 320 for example, the report server 300 generates a report, as described below. Also shown is a report authoring/design tool 325 which is used to create report definitions, as described herein.

Figure 4:
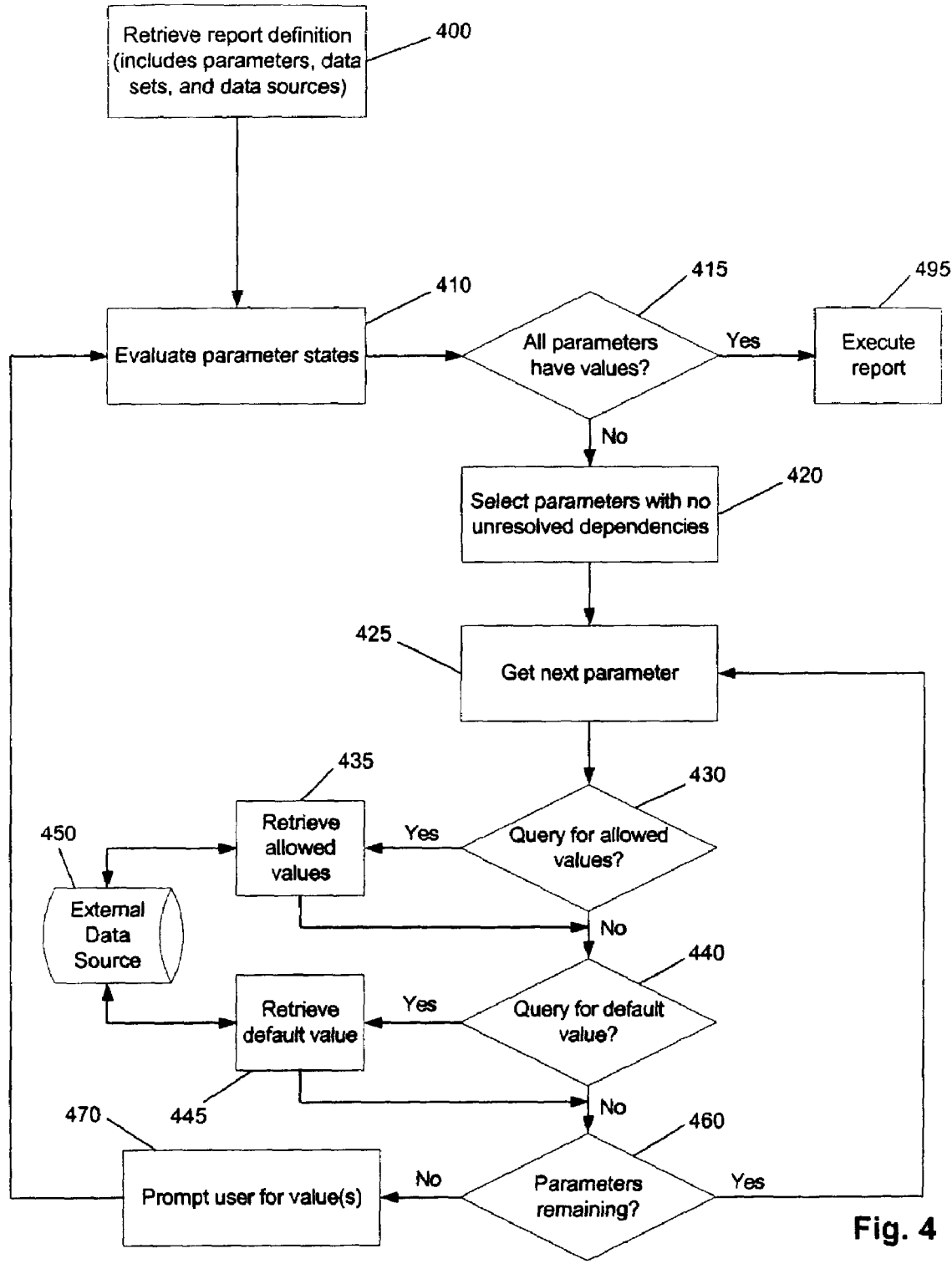
FIG. 4 is a flowchart of an exemplary method of report processing and generation in accordance with the present invention.

FIG. 4 is a flowchart of an exemplary method of report processing and generation in accordance with the present invention. It is contemplated that dependencies are determined as a pre-processing step. Specifically, if an individual report parameter's default value and/or allowed values cannot be immediately evaluated, a list of its dependencies is determined. This results in a tree structure indicating the dependencies for parameter input. For example, assume that there are three parameters defined for a report, Parameter1, Parameter2, and Parameter3. Parameter2's set of valid values are based on a query that uses the value of Parameter1. Parameters3's default value is based on a query that uses the value of Parameter1. Thus, when the parameter metadata is retrieved for the report, it would indicate that both Parameter2 and Parameter3 are dependent on Parameter1.

A report server begins processing, at step 400. At step 400, the appropriate report definition (described below, with respect to FIG. 5, for example) is retrieved from storage or otherwise generated, including parameters, data sets, and data sources. Parameter metadata is then evaluated at step 410. This metadata comprises such information as the allowed values and default value of the parameters, along with any values that the user has provided, as described below.

If all of the parameters have values, at step 415, then the report is executed at step 495. Otherwise, parameters with no unresolved dependencies on other parameters are selected, at step 420 for further processing. Parameters without any unresolved dependencies are processed to retrieve their allowed values and default values for presentation to the user for prompting. In this manner, a value retrieved or specified by the user for a parameter may be used to generate the set of the allowed values or default value of parameters later in the sequence. Thus, the set of allowed values and default value for a parameter is dynamically provided to the user, allowing a more efficient and precise process.

At step 425, a parameter that does not have any unresolved dependencies is selected. It is determined at step 430 if there is a query for the allowed values for the parameter. If so, then the allowed values are retrieved at step 435 using an external data source 450. Thus, with respect to the example above, if the parameter "state" is dependent on the parameter "region" for which the user had previously selected "northwest", then the allowed values retrieved at step 435 are states that are in the northwest region of the United States. These states will then preferably be provided to the user in a dropdown list, for example, as a prompt to choose the values to be used during report generation.

If there is no query specified for the allowed values at step 430, or after the allowed values are retrieved, then at step 440, it is determined if there is a query for default value. If so, then the default is retrieved at step 445 from the external data source 450. If not, or after the default value has been retrieved, then at step 460, it is determined if there are any additional parameters remaining that have no unresolved dependencies, from step 420. If there are additional parameters remaining, then processing continues at step 425, with the next parameter being processed.

After all of the parameters that do not have any unresolved dependencies have been processed, the user is prompted for value(s) at step 470 (e.g., the user makes his selection from the dropdown lists provided responsive to the retrieved allowed values and/or default values, such as, in keeping with the example above, the user chooses a state from the states presented in the dropdown list of the states in the northwest region), and processing continues at step 410 with additional parameters being retrieved and subsequently processed as set forth above. In this manner, the user is presented with a series of dropdown (or other types of) lists from which he is to make selections of values to be used in the subsequent report generation. The dropdown lists present a targeted subset of all choices, that subset containing the only prospective user responses (e.g., if the user had specified states in the northwest region of the United States, he will only then be presented with a dropdown list of states in the northwest region, and not a list of all the states in the United States; those states in the northwest region are considered to be the targeted subset of all choices).

Figure 5:
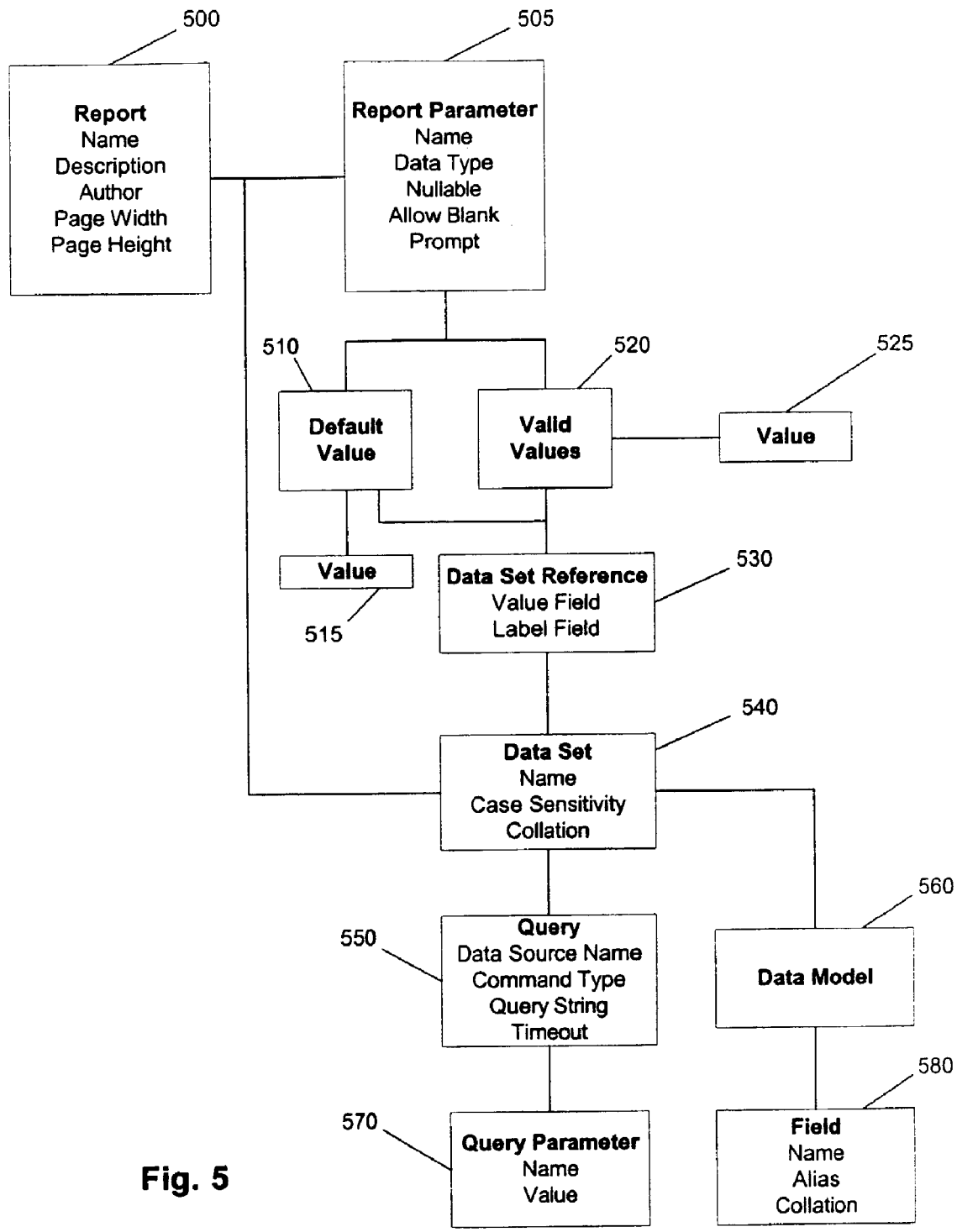
FIG. 5 is a diagram of an exemplary report definition in accordance with the present invention.

FIG. 5 is a diagram of an exemplary report definition in accordance with the present invention. A report 500 ultimately comprises metadata, such as name, description, author, and page width and height. The report is generated pursuant to report parameters 505 and data sets 540 based on query parameters 570, described further below. Each report parameter can optionally specify a default value 510 and set of valid values 520. The default value 510 can either be specified through a stored, constant value 515 or derived via a data set reference 530. Similarly, the valid values 520 can either be a set of stored, constant parameter values 525 or derived via a data set reference 530.

The data set 540 is generated pursuant to a query 550 and a data model 560. The query 550 comprises query parameters 570, along with the data model 560 which comprises various fields 580. The data set reference 530 comprises references to fields in a data set. The values of these fields are used as the default value (in the case of a default value with a data set reference) or as the value/label pairs (in the case of valid values with a data set reference).

Parameters are specified in the report definition. Parameter types include report parameters 505 and query parameters 570. A report parameter 505 is a value supplied to a report 500 (or contained within a report definition) that enables the report to show a different aspect of the data. A report parameter is typically used to provide values to query parameters. Additional uses of report parameters include post-query filtering and modification of the report appearance depending on expressions used in the report.

A query parameter 570 is a value supplied to a query 550 or stored procedure in a data processor that is used to return its results. The capabilities of query parameters are typically defined by the data processor (e.g., the data processor 315). Query parameters can be set to any allowable expression, including fixed values or expressions based on report parameters 505.

Query parameters are preferably passed to the data processor through the APIs that the data processor supports. After the query parameter expression is evaluated, the result is converted to the appropriate data type and then passed to the data processor. Query parameter syntax is preferably dependent on the data processor used. For example, SQL Server can use a question mark character in a SELECT statement such as "SELECT * FROM EMPLOYEES WHERE LEVEL=?". It can also use parameters defined directly in a stored procedure (e.g., "EXECUTE GetEmployee@EmployeeIDParm").

Table 1 shows exemplary metadata for parameters.

TABLE 1

| Name | Type | Description |
|---|---|---|
| Name | String | Name of parameter |
| Type | String | Data type of the parameter: boolean | datetime | double | integer | string |
| Nullable | Boolean | Indicates if the value of the parameter can be null. If true the value of the parameter can be null. |
| AllowBlank | Boolean | Indicates if empty string is valid value. If true empty string is a valid value. Ignored if Type is not string. |
| UsedInQuery | Boolean | Indicates that the parameter is used in a query. If true the parameter is used in the query. |
| Prompt | String | The prompt to display to the user when asking for parameter values. Default is the name followed by a ":" character. |
| PromptUser | Boolean | Whether the user is prompted for the value of this parameter. |
| Dependencies | (XML) | A list of report parameter names whose value(s) are used as parameters into queries used to retrieve ValidValues and/or Value. Returned if the ValidValues and/or Value are based on a query that has parameters. The top-level element is Dependencies. |
| ValidValues | (XML) | Possible values for the parameter to be used for display in user interface. May have 0 to n number of Value sub-elements. |
| DefaultValues | (XML) | Default values of the parameter. May have 0 to n number of Value sub-elements. |

Figure 6:
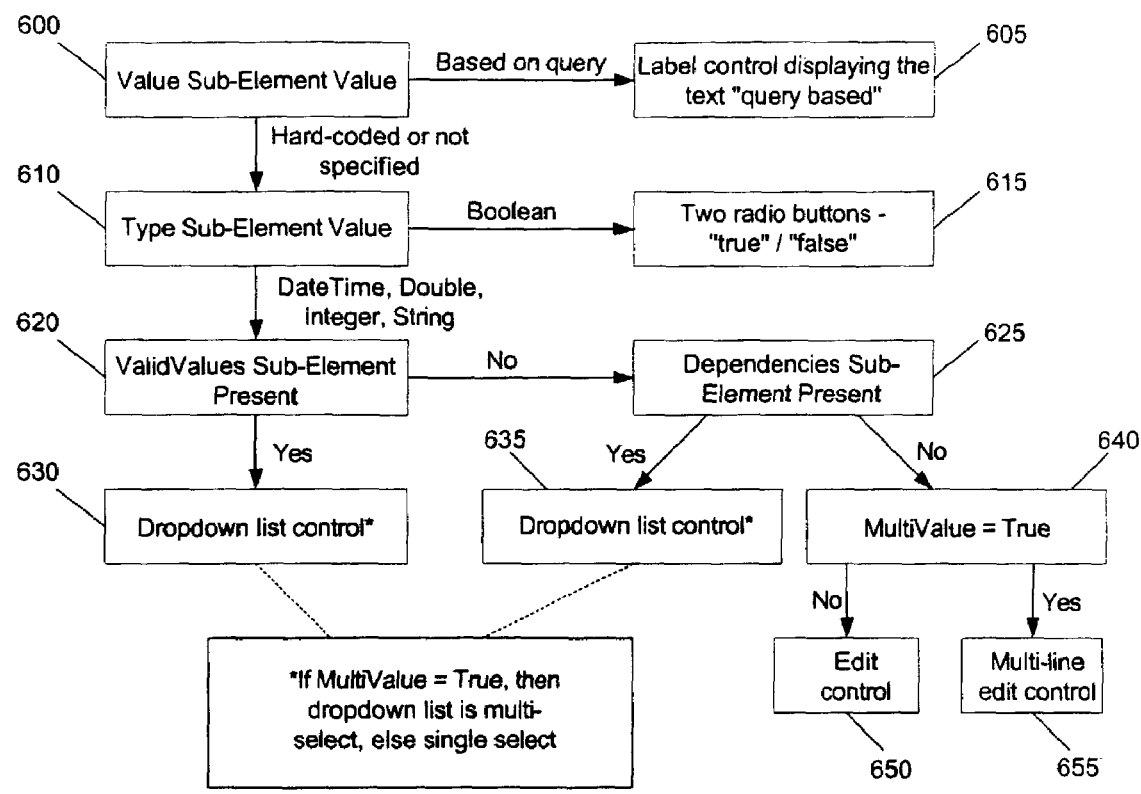
FIG. 6 is a tree diagram that is useful in describing how exemplary control(s) are presented to a user for each report parameter associated with a report.

FIG. 6 is a tree diagram that is useful in describing how exemplary control(s) are presented to a user for each report parameter associated with a report. A value based on a query is determined by the presence of the dependencies sub-element combined with the absence of the value sub-element in a parameter element. For the value sub-element, at step 600, it is determined whether its value is based on a query, hard-coded, or not specified. If the value is based on a query, then it is noted that the control is query based and an appropriate message is displayed, for example, at step 605. If the value is hard-coded or not specified, then the type sub-element value is determined, at step 610. If the type is Boolean, then "true" and "false" indicators (e.g., radio buttons) are provided or otherwise displayed, at step 615. Otherwise, if the type is DateTime, double, integer, or string, for example, it is determined whether valid values are provided, at step 620.

If valid values are not provided, then it is determined at step 625 whether the dependencies sub-element is provided. If not, then if there are multiple values, at step 640, multi-line edit control is provided at step 655. If multiple values are not present at step 640, then single-line edit control is provided at step 650. If the dependencies sub-element is present at step 625, then dropdown list control is provided at step 635. Similarly, if valid values are provided at step 620, then dropdown list control is provided at step 630. With respect to the dropdown list control, if there are multiple values present, then the dropdown list is preferably multi-selection; otherwise the dropdown list is preferably single select.

Figure 7:
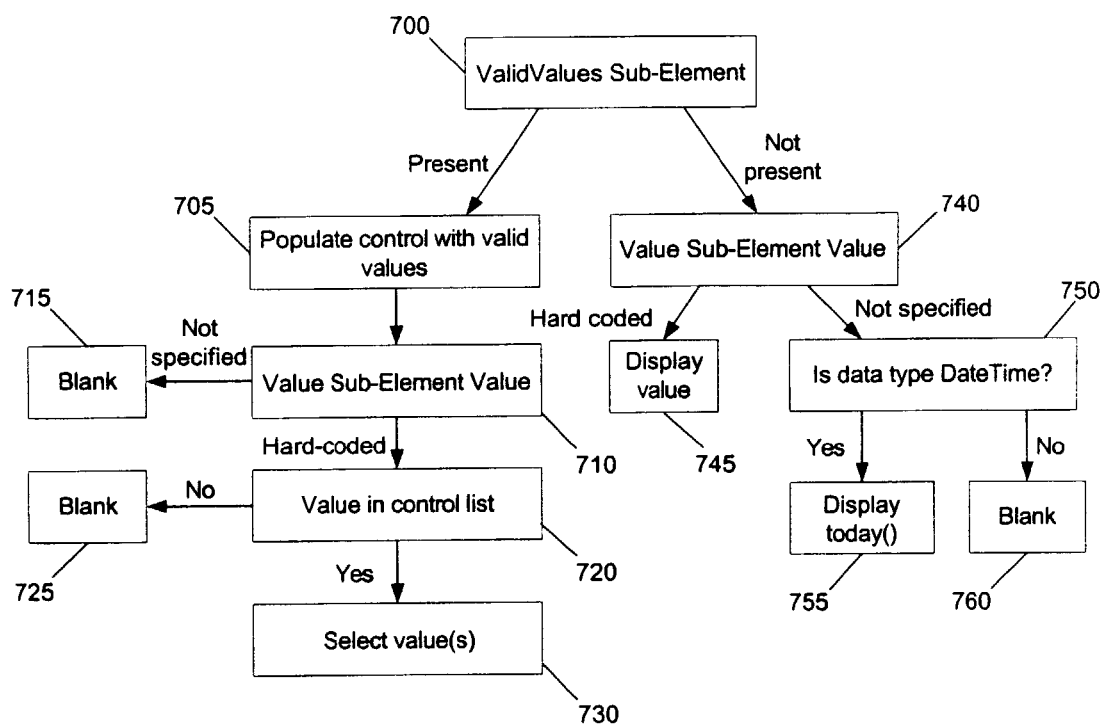
FIG. 7 is a tree diagram that is useful in describing how an exemplary control is initialized and its default value for each report parameter associated with a report.

FIG. 7 is a tree diagram that is useful in describing how an exemplary control is initialized and its default value for each report parameter associated with a report. Controls are initialized based on a number of conditions. Conditions include if there exists a valid value list and value, is there is a valid value, etc. Note that this initialization tree is typically applicable to parameters that are not derived from a query or user based. At step 700, it is determined whether a ValidValues sub-element is present. If not, the Value sub-element is determined, at step 740. If the value of the Value sub-element is hard-coded, then that value is displayed, at step 745. If the Value of the value sub-element is not specified, then it is determined whether the type sub-element is DateTime, at step 750. If so, then the current date and time is displayed, at step 755; otherwise, a blank is provided, at step 760.

If the ValidValues sub-element is present at step 700, then the control is populated with the valid values, at step 705. At step 710, the Value sub-element value is retrieved, and if the value is not specified, then a blank is provided, at step 715. If the value from step 710 is hard-coded, then it is determined at step 720 whether the value is in a previously defined or generated control list. If so, the value or values are selected, at step 730; otherwise, a blank is displayed, at step 725.

When a value for a report parameter is prompted for, the control (which may be HTML control) that is used for setting the value is based on a number of conditions. Conditions include where the default value is coming from, the parameter data type, if NULL is an acceptable value, if a predefined list of valid values exists, etc. The control(s) that are presented to the user for each report parameter associated with a report based on these conditions are preferably generated as set forth in FIG. 6 beginning at step 610, as described herein.

Figure 8:
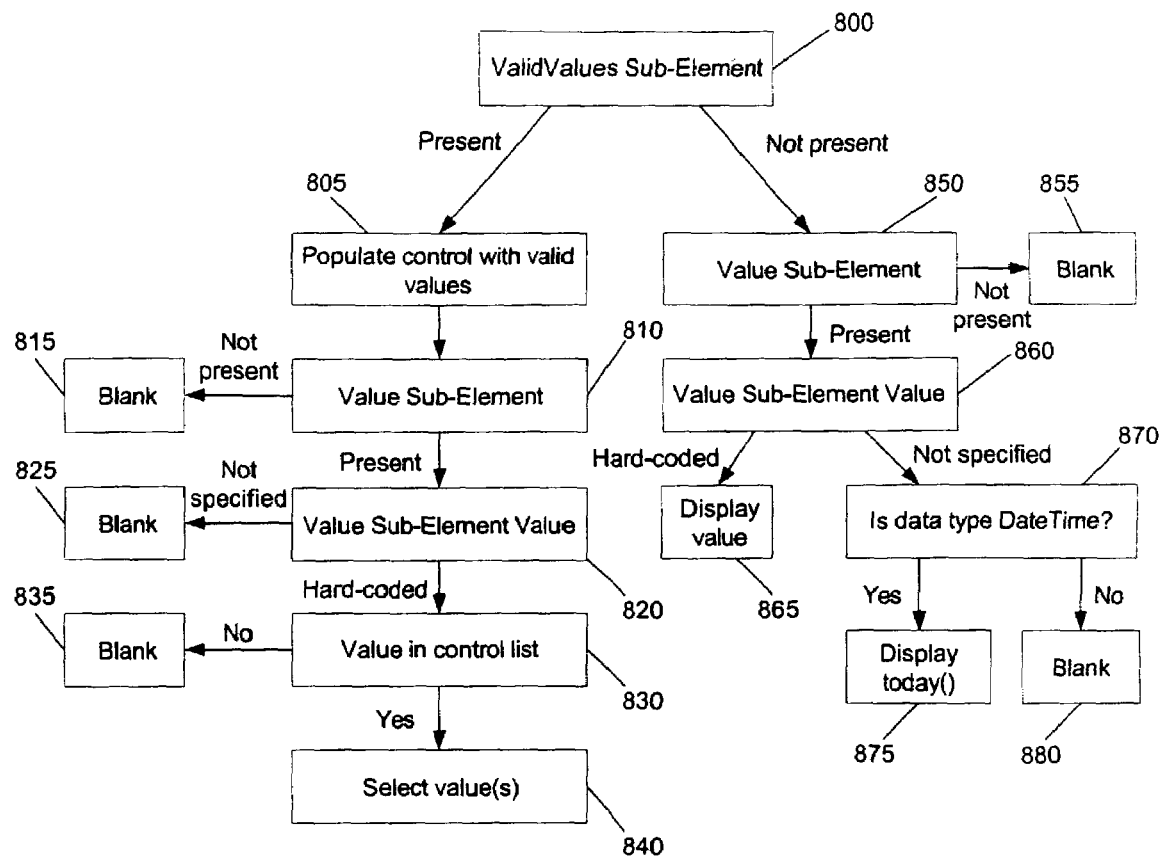
FIG. 8 is a tree diagram that is useful in describing how exemplary control(s) are presented to the user for each report parameter associated with a report based on conditions.

FIG. 8 is a tree diagram that is useful in describing how exemplary control(s) are presented to the user for each report parameter associated with a report based on conditions. Controls are initialized based on a number of conditions. Conditions include if there exists a valid value list and value, if there is a valid value, etc. FIG. 8 defines how a control is initialized and its default value for each report parameter associated with a report based these conditions. In some cases, it is contemplated that the value of the value sub-element may be NULL.

At step 800, it is determined whether or not a ValidValues sub-element is present. If the ValidValues sub-element is not present, then at step 850, it is determined whether a Value sub-element is present. If the Value sub-element is not present, then a blank is provided, at step 855. If the Value sub-element is present, it is then determined, at step 860, if the value of the Value sub-element is hard-coded. If so, then that value is displayed, at step 865. If the value of the value sub-element is not specified, then it is determined whether the type sub-element is DataTime, at step 870. If so, then the current date and time is displayed, at step 875; otherwise, a blank is provided, at step 880.

If a ValidValues sub-element is present at step 800, then the control is populated with the valid values, at step 805. At step 810, the Value sub-element value is retrieved, and if the value is not present, then a blank is provided, at step 815. If the value from step 810 is present, it is then determined, at step 820, if the value of the Value sub-element is hard-coded or not specified. If the value is not specified, then a blank is provided, at step 825. If the value of the Value sub-element is hard-coded, then it is determined at step 830 whether the value is in a previously defined or generated control list. If so, the value or values are selected, at step 840; otherwise, a blank is displayed, at step 835.

As mentioned above, while exemplary embodiments of the present invention have been described in connection with various computing devices and network architectures, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A method of report processing implemented at least in part by a computing device, the method comprising:
    (a) receiving a report definition having ordered sets of parameters, data sets and at least one data source, and receiving metadata related to each of the parameters, the metadata describing the relationship among the ordered sets of parameters, wherein the ordered sets of parameters comprise report parameters and query parameters;
    (b) receiving a plurality of values for a set of parameters in one of the ordered sets;
    (c) determining a set of dependencies of a subsequent narrowing set of report parameters and selecting report parameters having no unresolved dependencies on other parameters such that each selected report parameter in the subsequent set has at least one allowable value or is dependent on another report parameter having at least one allowable value;
    (d) generating, by the report server, a set of selectable values for the subsequent narrowing set of report parameters from which a user makes a selection, the generating responsive to submission of the report parameters selected as having no unresolved dependencies as query parameters in the report definition;
    (e) receiving a user selection identifying a value from among the selectable values of the set of report parameters which was generated;
    (f) repeating (a) through (e) until all parameter values have been specified for each set of report parameters of the set of dependencies; and
    (g) executing a report by a report server and accessing the at least one datasource by one or more queries based on the report definition, the plurality of values received, data sets, and the value or values identified by the user selection or selections, after all the parameter values have been specified for each set of report parameters, where report parameters provide values to respective query parameters, and ordering the report based on the plurality of values received.

2. The method of claim 1, wherein generating the selectable values comprises receiving a set of allowed values and default value for the subsequent set of parameters based on the values received for the first set of parameters.

3. The method of claim 1, further comprising receiving a set of allowed values for the subsequent parameters and constraining the set of allowed values to a subset based on the value received for the first set of parameters.

4. The method of claim 1, wherein generating the selectable values comprises generating a dropdown list comprising the set of allowed values for each subsequent parameter, and wherein each report parameter is comprised of: a parameter name, a data type, and a plurality of allowed values.

5. The method of claim 4, further comprising displaying the dropdown list and receiving an input selection, the input selection corresponding to a value received for each subsequent parameter.

6. The method of claim 1, wherein receiving the values comprises receiving a default value from a storage device.

7. The method of claim 1, wherein receiving the values comprises receiving a value corresponding to a user input value.

8. The method of claim 1, further comprising generating additional selectable values for requests for a value for additional parameters of the ordered set of parameters, each additional selectable value comprising a set of allowed values for the associated parameter, the set of allowed values being determined responsive to at least one previously received value.

9. The method of claim 8, wherein generating the additional selectable values comprises generating the additional selectable values in a sequential order based on dependencies between the parameters.

10. The method of claim 8, wherein each of the additional parameters is without an unresolved dependency.

11. The method of claim 1, further comprising modifying the appearance of the report depending on at least one expression used in the report and performing post-query filtering based on at least one of the report parameters.

12. A computer-readable storage medium having stored thereon computer-executable instructions for performing a method of report processing, the method comprising:
    (a) receiving a report definition, wherein the report definition comprises at least one set of parameters, at least one data set and at least one data source; and receiving metadata relating to each of the parameters and describing the relationship among the parameters, wherein the parameters comprise report parameters and query parameters;
    (b) receiving a plurality of values for a first set of report parameters in one of the ordered sets;
    (c) determining a set of dependencies of a subsequent narrowing set of report parameters and selecting parameters having no unresolved dependencies on other parameters such that each selected report parameter in the subsequent set has at least one allowable value or is dependent on another parameter having at least one allowable value, and generating a set of selectable values for the subsequent narrowing set of report parameters from which a user can make a selection, the generating responsive to submission of the parameters selected as having no unresolved dependencies as query parameters;
    (d) receiving a user selection identifying a value from among the selectable values of the set of parameters which was generated;
    (e) repeating steps (a) through (d) until all parameter values have been specified for each set of report parameters; and
    (f) executing, by a report server, a report based on the report definition, the plurality of values received, and the value identified by the user selection, after all the parameter values have been specified for each set of parameters, and ordering the report based on the plurality of values received.

13. The computer-readable storage medium of claim 12, wherein generating the selectable values comprises receiving a set of allowed values and default value for the subsequent set of report parameters based on the values received for the first set of parameters.

14. The computer-readable storage medium of claim 12, further comprising computer-executable instructions for receiving a set of allowed values for the subsequent report parameters and constraining the set of allowed values to a subset based on the value received for the first set of report parameters.

15. The computer-readable storage medium of claim 12, wherein generating the selectable values comprises generating a dropdown list comprising the set of allowed values for each subsequent report parameter.

16. The computer-readable storage medium of claim 15, further comprising computer-executable instructions for displaying the dropdown list and receiving an input selection, the input selection corresponding to a value received for each subsequent report parameter.

17. The computer-readable storage medium of claim 12, wherein receiving the values comprises receiving a default value from a storage device.

18. The computer-readable storage medium of claim 12, wherein receiving the values comprises receiving a value corresponding to a user input value, and wherein the metadata is received prior to receiving any user input value.

19. The computer-readable storage medium of claim 12, further comprising generating additional selectable values for requests for a value for additional parameters of the ordered set of report parameters, each additional selectable value comprising a set of allowed values for the associated parameter, the set of allowed values being determined responsive to at least one previously received value.

20. The computer-readable storage medium of claim 19, wherein generating the additional selectable values comprises generating the additional selectable values in a sequential order based on dependencies between the parameters.

21. The computer-readable storage medium of claim 19, wherein each of the additional parameters is without an unresolved dependency.

22. The computer-readable storage medium of claim 12, further comprising computer-executable instructions for modifying the appearance of the report depending on at least one expression used in the report and performing post-query filtering based on at least one of the report parameters.

23. A system for processing a report, the system comprising:
 a storage device that stores data related to a plurality of parameters; and
 a report server coupled to the storage device and comprising a report processor and a data processor that:
 (a) receives a report definition having ordered sets of parameters, and receives metadata related to each of the parameters, the metadata describing the relationship among the parameters, wherein the parameters comprise report parameters and query parameters;
 (b) receives a plurality of values for a first set of report parameters in one of the ordered sets;
 (c) determines a set of dependencies of a subsequent narrowing set of report parameters and selects parameters having no unresolved dependencies on other parameters such that each selected report parameter in the subsequent set has at least one allowable value or is dependent on another parameter having at least one allowable value;
 (d) generates a set of selectable values for the subsequent narrowing set of report parameters from which a user can make a selection, wherein generation of the set of selectable values is responsive to submission of the parameters selected as having no unresolved dependencies as query parameters which are communicated to a query database;
 (e) receives a user selection identifying a value from among the selectable values of the set which was generated;
 (f) repeats steps (a) through (e) until all parameter values have been specified for each set of report parameters; and
 (g) executes a report based on the report definition and the received values, and orders the report based on the plurality of values received.

24. The system of claim 23, wherein the report server, in generating the plurality of prompts, receives a set of allowed values and default value for the subsequent set of parameters based on the values received for the first set of parameters.

25. The system of claim 23, wherein the report server receives a set of allowed values for the subsequent parameters and constrains the set of allowed values to a subset based on the value received for the first set of parameters.

26. The system of claim 23, wherein the report processor generates a dropdown list comprising the set of allowed values for each subsequent parameter.

27. The system of claim 23, wherein the report server displays the dropdown list and receives an input selection, the input selection corresponding to a value received for each subsequent parameter.

28. The system of claim 23, wherein at least one of the values comprises a default value from the storage device.

29. The system of claim 23, wherein at least one of the values comprises a value corresponding to a user input value.

30. The system of claim 23, wherein the report processor generates additional selectable values for requests for a value for additional parameters of the ordered set of parameters, each additional selectable value comprising a set of allowed values for the associated parameter, the set of allowed values being determined responsive to at least one previously received value.

31. The system of claim 30, wherein the report processor generates the additional selectable values in a sequential order based on dependencies between the parameters.

32. The system of claim 30, wherein each of the additional parameters is without an unresolved dependency.

33. The system of claim 23, wherein the report server modifies the appearance of the report depending on at least one expression used in the report and performs post-query filtering based on at least one of the report parameters.

* * * * *